US012759005B2

(12) United States Patent
Antolotti et al.

(10) Patent No.: US 12,759,005 B2
(45) Date of Patent: Oct. 13, 2026

(54) METHOD FOR THERMAL SPRAY DEPOSITION OF A COATING ON A SURFACE AND APPARATUS

(71) Applicant: TURBOCOATING S.P.A., Solignano (IT)

(72) Inventors: Nelso Antolotti, Solignano (IT); Mauro Antolotti, Solignano (IT); Luigi Coppelletti, Solignano (IT)

(73) Assignee: LINCOTEK RUBBIANO S.P.A., Solignano (IT)

( * ) Notice: Subject to any disclaimer, the term of this patent is extended or adjusted under 35 U.S.C. 154(b) by 388 days.

(21) Appl. No.: 17/947,502

(22) Filed: Sep. 19, 2022

(65) Prior Publication Data

US 2023/0014591 A1 Jan. 19, 2023

Related U.S. Application Data

(63) Continuation-in-part of application No. 16/063,248, filed as application No. PCT/IB2016/057703 on Dec. 16, 2016, now abandoned.

(30) Foreign Application Priority Data

Dec. 16, 2015 (IT) .................................... 20159465

(51) Int. Cl.
*B05B 13/04* (2006.01)

(52) U.S. Cl.
CPC ........ *B05B 13/0431* (2013.01); *B05B 13/041* (2013.01); *B05B 13/0421* (2013.01)

(58) Field of Classification Search
CPC . B05B 13/0421; B05B 13/0431; B05B 13/04; B05B 13/0405; B05B 13/041; B05C 7/00–08
See application file for complete search history.

(56) References Cited

U.S. PATENT DOCUMENTS 3,230,341 A * 1/1966 Blackburn ............... B23K 9/30 318/281
3,819,901 A 6/1974 Berinde et al.
(Continued)

FOREIGN PATENT DOCUMENTS

WO 2007116036 A1 10/2007
WO 2009023682 A1 2/2009
WO 2010048120 A2 4/2010

OTHER PUBLICATIONS

International Search Report in International Application PCT/IB2016/057703, WIPO date Jun. 22, 2017.
(Continued)

*Primary Examiner* — Dah-Wei D. Yuan
*Assistant Examiner* — Stephen A Kitt
(74) *Attorney, Agent, or Firm* — Kristina Castellano; CASTELLANO PLLC

(57) ABSTRACT

Methods of deposition of a coating on a surface of a workpiece, working with at least one deposition device, or torch, of thermal spray type, controlled by an associated motor. It is contemplated to perform the deposition step by configuring the torch so as to create two concurrent movements, of which a first movement along a linear path on the surface area to be coated; a second oscillation movement according to an axis of rotation coaxial with said advancement direction; this allows increasing the spray pattern of the thermal spray torch at each stroke resulting in a reduction of the relative movement speed of the torch itself. Also provided are a thermal spray deposition torches and apparatuses for depositing a coating on a surface of a workpiece.

18 Claims, 3 Drawing Sheets

(56) References Cited

U.S. PATENT DOCUMENTS

| | | | | |
|---|---|---|---|---|
| 4,191,791 | A * | 3/1980 | Lyons | B05B 13/0431 427/455 |
| 4,514,443 | A * | 4/1985 | Kostecki | C23C 4/16 118/704 |
| 5,539,177 | A * | 7/1996 | Okuya | B23K 9/0284 219/125.11 |
| 5,679,167 | A * | 10/1997 | Muehlberger | C23C 4/134 219/121.48 |
| 6,256,597 | B1 | 7/2001 | Wang et al. | |
| 6,392,190 | B1 | 5/2002 | Sue | |
| 2006/0127589 | A1 * | 6/2006 | Kleba | B29C 41/20 118/302 |
| 2014/0291885 | A1 | 10/2014 | Etchegoyen | |
| 2015/0315710 | A1 | 11/2015 | Penn | |

OTHER PUBLICATIONS

Written Opinion in International Application PCT/IB2016/057703, WIPO date Jun. 22, 2017.
International Preliminary Report on Patentability in International Application PCT/IB2016/057703, WIPO date Jun. 19, 2018.
"Align", definition from the Free Dictionary, retrieved Nov. 16, 2021.
"Corresponding", definition from the Free Dictionary, retrieved Nov. 16, 2021.

* cited by examiner

METHOD FOR THERMAL SPRAY DEPOSITION OF A COATING ON A SURFACE AND APPARATUS

CROSS REFERENCE TO RELATED APPLICATIONS

The present application is a Continuation-in-Part of U.S. application Ser. No. 16/063,248 filed in the USPTO on Jun. 16, 2018 as a U.S. National Stage application of PCT/IB2016/057703 filed on Dec. 16, 2016, which claims priority to Italian Patent Application ITUB20159465 filed on Dec. 16, 2015, the contents of each of which are incorporated herein by reference.

FIELD OF THE INVENTION

The present invention relates to methods of deposition of coating material in "thermal spray" technologies, thermal spray deposition torches, and apparatuses.

BACKGROUND OF THE INVENTION

The possibility of applying a coating or a surface treatment to mechanical components and obtain functional properties that would not be obtained with the substrate and coating materials taken individually is widespread.

An example are the materials exhibiting good mechanical strength properties, but they have a non-optimal behavior when wear or corrosion phenomena are present. In these cases, a surface treatment or a coating is applied to the surface of the component in order to improve the anti-wear or anti-corrosion properties.

There are many deposition technologies, which differ in the features of the coating to be obtained and can be classified according to different criteria such as, for example, the thickness of the coatings that can be obtained and the starting physical state of the materials used for coating.

Among these technologies, the thermal spray technologies have taken on particular importance due to the large variety of materials usable for the deposition and the features of the coatings that can be obtained. The principle of thermal spray technologies consists in administering energy to the material to be deposited until it is brought to melting and then transport it toward the substrate to be coated.

Because the thermal spray processes are essentially unidirectional, the torch is normally moved by a robot arm or CNC, so that it can follow quite complex profiles.

The torch used is generally operated with direct current. Briefly, the cathode has a toroidal shape and is typically made of copper with possible insert in tungsten in order to improve the surface features, while the anode of cylindrical shape can be made of copper; both are internally water-cooled. In order to cause the formation of the plasma, an electric arc is made to strike between the cathode tip and the anode inner region. The plasma is continuously supported by the supply of new plasmagenic gas; once fully operating, the plasma takes the form of a cylindrical flame exiting from the nozzle. The temperature reached by the plasma is of the order of 9000÷20000 K.

When the plasma reaches in the vicinity of the nozzle, the ions and the electrons tend to recombine, thus promoting a high level of enthalpy. The powder is radially introduced in this area, usually by a carrier gas; it melts due to the energy supplied by the recombination of positive ions and electrons, it is conveyed by the flame and accelerated against the substrate, against which it strikes and proceeds to rapid solidification.

Based on the parameters considered above, different values of the energy required to melt the particles can be obtained.

The traditional processes perform the coating by moving the torch and creating a path of the "fretted" type, i.e. forward and backward, by a plurality of rectilinear swipes adjacent to each other.

In order to do so, the robot or CNC must maintain a certain speed, actually quite fast, of the order of 50-60 meters per minute, so as to prevent the torch from depositing too much material (thereby limiting the deposit thickness) in addition to the overheating of the surface/coated workpiece.

Nevertheless, such known technologies involve some drawbacks.

A first drawback is the fact that when large and/or irregular surfaces are coated, there is a certain difficulty to follow and maintain the robot at the required speed, which can result in greater stress and possible breakage or requests for intervention.

A second drawback is related to the process, because the direction change areas must stand outside of the surface/workpiece being coated, precisely because of the high speeds required to the robot and relative reversal inertias, with consequent waste of material during such a reversal.

SUMMARY OF THE INVENTION

The aim of the present invention is to provide a method and an apparatus which eliminate the above drawbacks.

Within the scope of this aim, an object of the invention is to provide a method and an apparatus that perform a better control of coating thickness, with greater precision than a conventional torch, which also allows carrying out the process on (both inner and outer) surfaces of shaped workpieces and at the same time impart grater control to the robot.

Another object of the invention is to provide a method and an apparatus which allow increasing the spray pattern of the thermal spray torch at each swipe with consequent reduction of the relative speed of displacement of the torch itself and saving time for spraying the workpiece.

A further object of the invention is also to reduce the localized temperature allowing for continuous spraying without interruption.

Another object of the invention is to save consumable material (electrodes, nozzles, wire, etc) and to reduce wear of the deposition torch movement robots.

This aim, as well as these and other objects are achieved by a method, a torch and an apparatus for depositing a coating on a surface of a workpiece.

The present method provides a thermal spray deposition torch including a main body having, preferably, an elongated shape developing around a longitudinal axis, and is provided, at one end of the main body, of at least one spray head, said at least one spray head including at least one dispensing nozzle, and joining the torch, at the other end, to a supporting arm of a robot by a coupling system, and controlling the torch by the robot.

The method further includes carrying out the deposition by providing a jet of material to be deposited and moving said torch so as to create two concurrent movements and direct the jet of material to be deposited accordingly, wherein said concurrent movements include:

a first movement along an area of the surface to be coated and in a direction corresponding to the longitudinal axis, said first movement defining a linear path for the jet and being, preferably, carried out by linear advancement of the supporting arm of the robot with the torch, a second movement of oscillation according to a plane which is transversal to the longitudinal axis, said second movement being carried out by a rotation of the nozzle about said longitudinal axis with respect to the coupling system and, preferably, by a motor. The motor is either connected to the main body so as to rotate the nozzle with respect to the main body, or connected to the supporting arm so as to rotate the main body.

With this solution, the overall coating speed, defined by the oscillation of the material cooperating with the advancement imposed to the torch by the robot (or a CNC), has ameliorative effects in many aspects: in particular, the combination between the linear path defined by the low speed advancement of the robot and the corresponding oscillation of the deposition material dispensed through the torch nozzles, creates a spray pattern (stripe) of product deposited, much wider than that deposited with a single non-oscillating swipe, and at the same time preserves the sprayed thickness within the required limits.

It should be noticed that the present invention is not only limited to a specific thermal spray technology, but to all technologies involving thermal spraying.

Possible examples of the thermal spray technologies are the following: Combustion Flame Spray, Arc Flame Spray, Plasma Spray, HVOF (High Velocity Oxygen Fuel), Cold Spray.

According to one aspect of the invention, the thermal spray deposition torch has substantially cylindrical shape. This aspect allow a better control of the distance between longitudinal axis and the surface to be coated.

According to another aspect of the invention, during the two concurrent movement, the longitudinal axis is maintained at a predetermined distance from the surface of the workpiece, allowing a constant thickness of the coating.

Preferably, the apparatus includes at least two nozzles.

The motor is able to rotate the nozzle only or the spray head (or the main body together with the spray head) together with the nozzle with respect to the coupling system.

Therefore, each nozzle is rotatable, during the second movement, directly or indirectly.

In one embodiment, the nozzle is rotatable indirectly, rotating the main body (and the spray head together with the main body).

In fact, according to one aspect of the invention, the second movement is carried out by a rotation of the spray head of the thermal spray deposition torch about the longitudinal axis by the motor. A motion transmission mechanism is suitably provided between the motor and the main body, or between the motor and the supporting arm.

The method provides, the oscillation takes place with dedicated apparatus and/or method for the movements configured so as to put in rotation the torch and wherein the coating material dispensing nozzles are fixed with respect to the torch head. Consequently, the rotational movement of the torch head defines the rotational movement of the nozzle, so the second moment of oscillation to the jet of material.

In another embodiment, the nozzles are rotatable directly, so their rotational movement is independent with respect to the torch head.

In fact, according to another aspect of the invention, the second movement is carried out by a rotation of the nozzle only of the thermal spray deposition torch about the longitudinal axis and by the motor. A motion transmission mechanism is suitably provided between the motor and the torch head or directly between the motor and the nozzle.

According to a further embodiment, the second movement is carried out by a rotation of the spray head and of the nozzle only of the thermal spray deposition torch about the longitudinal axis by the motor. Especially in the case of HVOF type torches, the oscillation is applied both to the torch and to the nozzles, always through appropriate motion return mechanisms.

According to another aspect of the invention, the second movement in an oscillation of +/−30° on the plane which is transversal to the longitudinal axis.

According to a further aspect of said invention, the second movement in an oscillation of +/−15° on the plane which is transversal to the longitudinal axis.

These ranges permit an increase of the spray pattern of the thermal spray torch with, at the same time, a good distribution of the material.

The invention also relates to a thermal spray deposition torch including a main body having an elongated shape developing around a longitudinal axis, and provided, at one end of the main body, of a spray head and at least one dispensing nozzle (preferably two nozzles) configured to create a jet of material to be deposited on a surface to be coated.

The torch is configured to be controlled by a robot and preferably includes a coupling system configured to join the torch, at the other end of the main body, to a supporting arm of the robot.

Preferably, the torch includes a motor configured to rotate the at least one nozzle with respect to the main body or configured to rotate the main body.

According to one aspect of the invention, the torch is further configured to create two concurrent movements to a jet of material to be deposited, of which:

a first movement along an area of the surface to be coated and in a direction corresponding to the longitudinal axis, defining a linear path for said jet, said first movement being carried out by linear advancement of said torch, a second movement of oscillation according to a plane which is transversal to said longitudinal axis, this said second movement being carried out by a rotation of said at least one nozzle about the longitudinal axis with respect to the coupling system by the motor.

Preferably, the motor is able to rotate the nozzle and/or the spray head with respect to the coupling system.

In fact, according to a possible embodiment, the motor is connected to the main body, so that the second movement is carried out by a rotation of the nozzle only about the longitudinal axis and with respect to the main body.

A motion transmission mechanism is suitably provided between the motor and the main body.

According to another embodiment, the motor is connected to the supporting arm, so that the second movement is carried out by a rotation of the main body about the longitudinal axis, together with the nozzle.

The invention also relates to an apparatus for depositing a coating on a surface of a workpiece which includes a robot including a supporting arm and motor configured to rotate the supporting arm.

Preferably, the apparatus further includes a thermal spray deposition torch including a main body having an elongated shape developing around a longitudinal axis, and is provided, at one end of the main body, of a spray head and at least one dispensing nozzle configured to create a jet of material to be deposited on a surface to be coated.

Preferably, the torch is configured to be controlled by the robot and includes a coupling system configured to join the torch, at the other end of the main body, to the supporting arm of the robot, the apparatus being configured so as to move the torch according to two concurrent movements and create a jet of material to be deposited moving along said concurrent movements, of which:

- a first movement along an area of the surface to be coated and in a direction corresponding to said longitudinal axis, defining a linear path for said jet, the first movement being carried out by linear advancement of the robot with the torch joined to the supporting arm,
- a second movement of oscillation according to a plane which is transversal to the longitudinal axis, this said second movement being carried out by a rotation of said at least one nozzle about the longitudinal axis with respect to the coupling system and by the motor.

The robot is configured to support the torch during at least the first movement, consequently, the robot is able to move the torch provided with the dispensing nozzle, so moving the nozzle according to the first movement.

BRIEF DESCRIPTION OF THE FIGURES

This and other features will become more apparent from the following description of some of the non-limiting configurations, illustrated purely by way of example in the accompanying drawings.

DETAILED DESCRIPTION OF THE INVENTION

Figure 1:
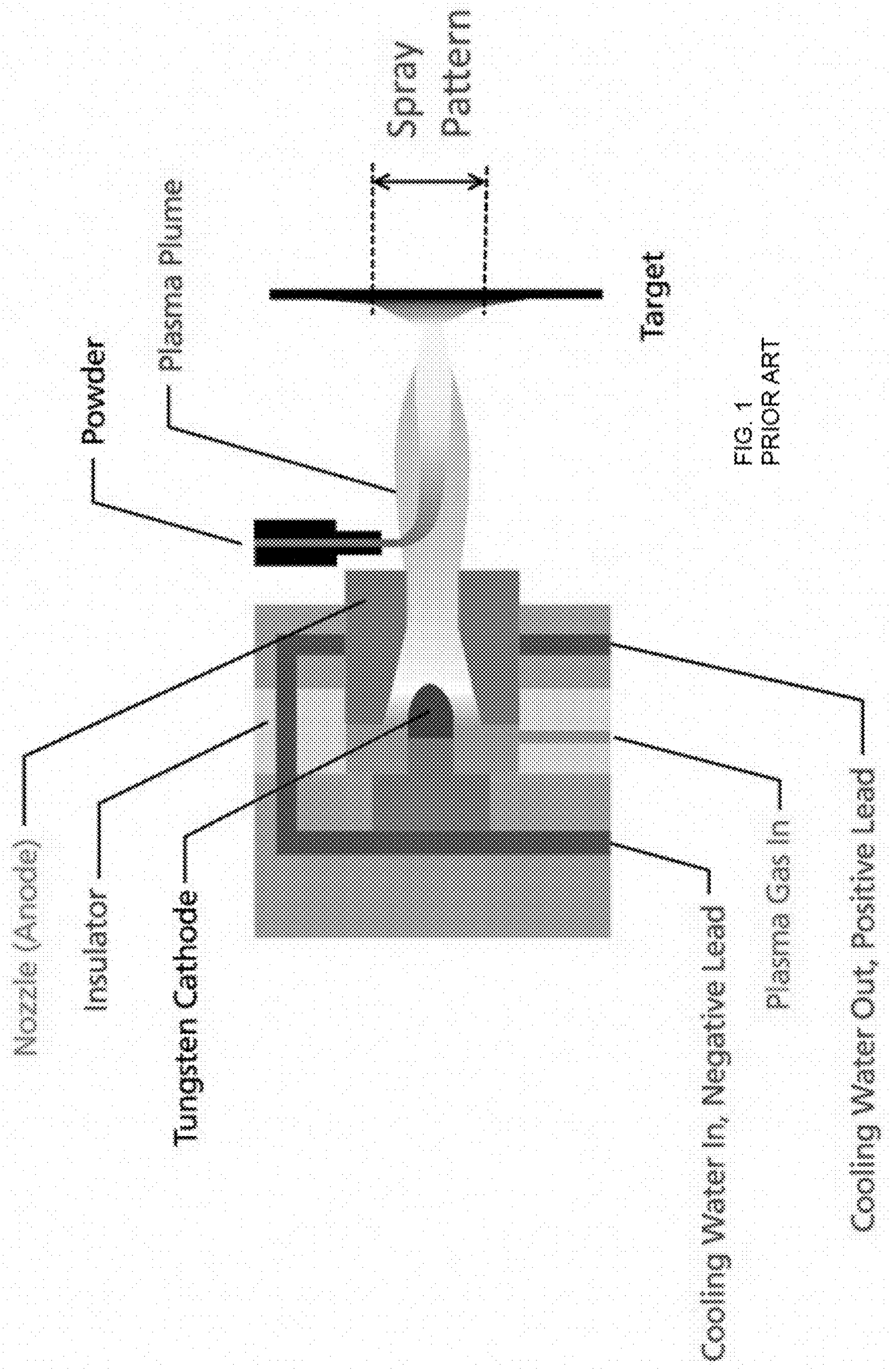
FIG. 1 PRIOR ART
FIG. 1: shows a conventional Thermal Spray deposition torch, according to the prior art, with the denomination of the component parts of the apparatus.
Figure 2:
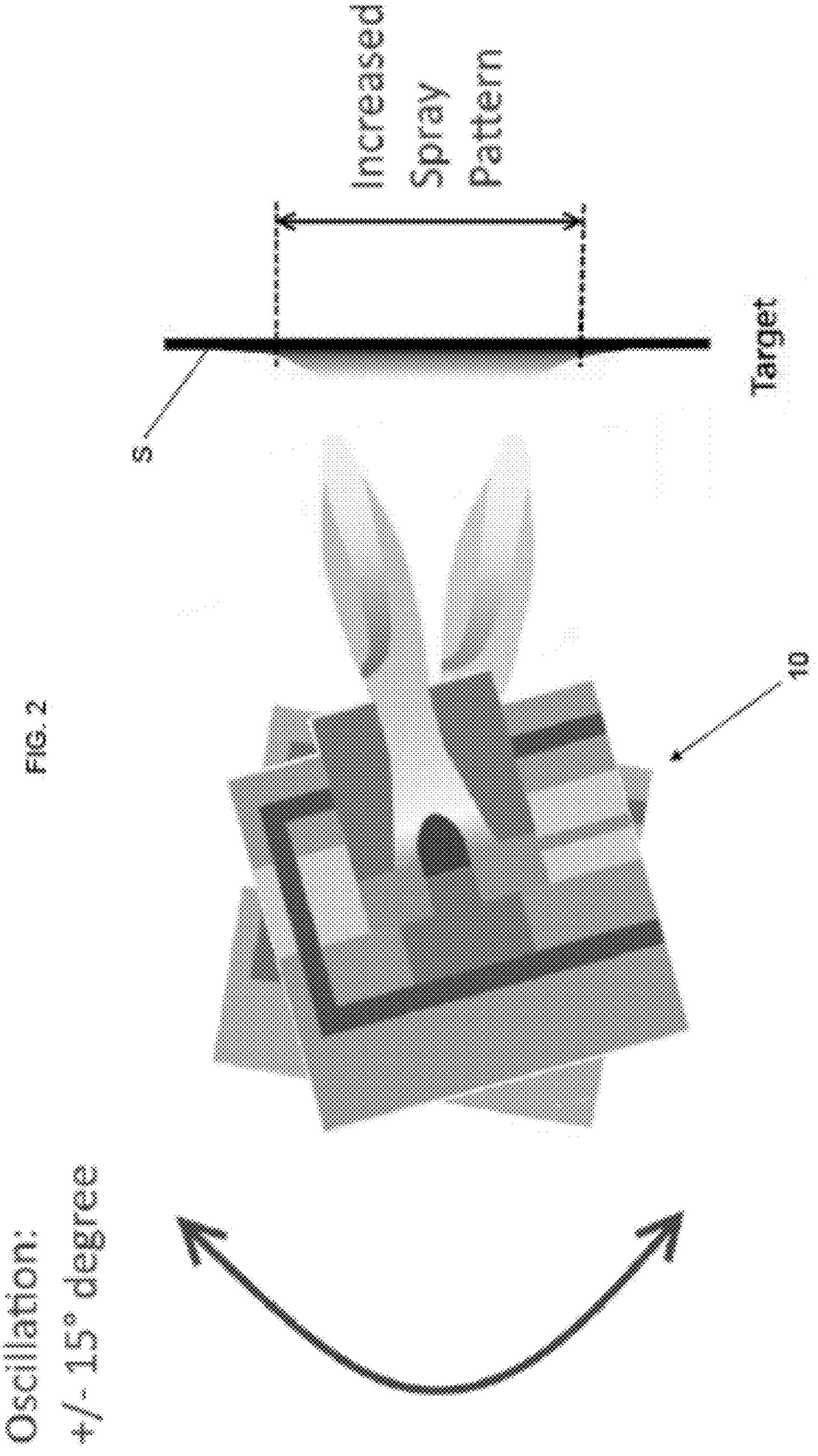
FIG. 2: shows an example of application of the present invention, with oscillating system on a plasma torch for thermal spray; the example is not limiting, the system may be applied to other thermal spray technologies (APS, HVOF, Flamepray, Arcspray, etc.).

With particular reference to the figures, reference numeral 10 indicates a thermal spray torch including a spray head 12 and at least one nozzle 11 through which a flow F, which consists of a jet of material, comes out which conveys coating material with filling R is made on surface S of the workpiece.

Figure 3:
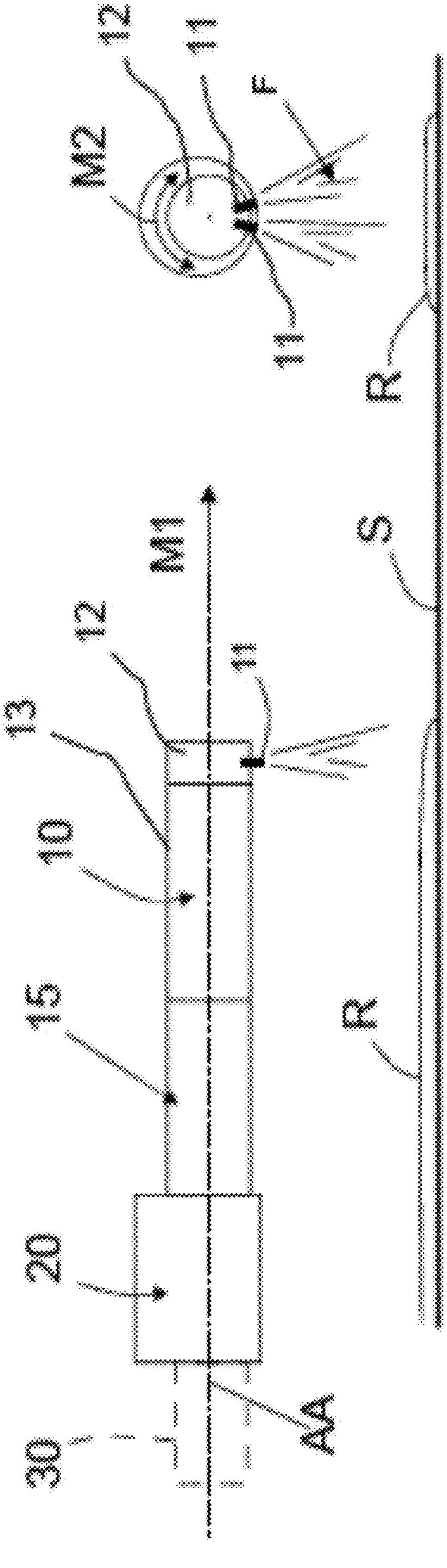
FIG. 3: shows the operational step of an example torch in accordance with the present invention, embodying example methods of the invention.

Methods according to the present invention, provide a thermal spray deposition torch 10. The torch 10 includes a main body 13 having an elongated shape developing around a longitudinal axis AA and is provided, at one end of the main body, of a spray head. This spray head includes two dispensing nozzles 11, as shown in FIG. 3.

The method includes joining the torch 10, at the other end, to a supporting arm 15 of a robot 30 by a coupling system and controlling the torch 10 by the robot 30.

The method further includes carrying out the deposition by providing a jet of material to be deposited and moving the torch 10 so as to create two concurrent movements and direct the jet of material to be deposited accordingly.

The concurrent movements include:

- a first movement M1 along an area of the surface S to be coated and in a direction corresponding to the longitudinal axis AA, the first movement M1 defining a linear path for the jet and being carried out by linear advancement of the supporting arm 15 of the robot 30 with the torch 11;
- a second movement M2 of oscillation according to a plane which is transversal to the longitudinal axis AA, this second movement M2 being carried out by a rotation of the nozzles 11 about the longitudinal axis AA with respect to the coupling system and by a motor 20 which is either connected to the main body so as to rotate the nozzles 11 with respect to the main body, or connected to the supporting arm 15 so as to rotate the main body.

During the two concurrent movements, the longitudinal axis AA is maintained at a predetermined distance from the surface of the workpiece.

The torch 10 has substantially cylindrical shape.

The torch 10 head is mechanically associated with the motor 20 able to create a rotation according to the longitudinal axis AA which will correspond, in operating conditions, to the linear advancement axis of the torch itself.

The motor 20 is able to rotate the nozzles only or the spray head together with the nozzles with respect to the coupling system.

According to a possible embodiment, the second movement M2 is carried out by a rotation of the spray head of the thermal deposition torch 10 about the longitudinal axis by the motor 20.

According to another embodiment, the second movement M2 is carried out by a rotation of the nozzles 11 only about the longitudinal axis AA by the motor 20.

According to a further embodiment, the second movement M2 is carried out by a rotation of the spray head together with of the nozzles 11 of the spray deposition torch 10 about longitudinal axis by the motor 20.

In the example, the motor 20 is configured to impart a rotation (i.e. an oscillation) of +/−15°, however, this value is not binding for the requested protection and can be increased or reduced according to the requirements. For example, the rotation can be of +/−30°. So, the second movement M2 is an oscillation of, preferably, +/−30° or +/−15° on the plane which is transversal to the longitudinal axis AA.

The torch oscillation allows increasing the spray pattern and thereby reduce the translation speed, this allows controlling the position with higher precision.

As stated above, the thermal spray deposition torch 10 include a main body having an elongated shape developing around a longitudinal axis AA, and provided, at one end of the main body, of a spray head and two dispensing nozzles 11 configured to create a jet of material to be deposited on a surface (S) to be coated. The torch 10 is configured to be controlled by a robot 30 and includes a coupling system configured to join the torch 10, at the other end of the main body, to a supporting arm 15 of the robot 30. The torch 10 also includes a motor 20 configured to rotate the nozzles with respect to the main body or configured to rotate said main body, the torch 10 being further configured so as to create two concurrent movements to a jet of material to be deposited, of which:

- a first movement M1 along an area of the surface S to be coated and in a direction corresponding to the longitudinal axis AA, defining a linear path for the jet, said first movement M1 being carried out by linear advancement of the torch,
- a second movement M2 of oscillation according to a plane which is transversal to the longitudinal axis, this second movement M2 being carried out by a rotation of the nozzles about the longitudinal axis AA with respect to coupling system by the motor 20.

The motor 20 is able to rotate the nozzles and/or the spray head with respect to the coupling system.

In the example, the motor 20 is connected to the supporting arm. In other embodiments it can be connected directly to the main body.

The motor 20, together with a mechanical motion transmission mechanism (not shown), constitutes an oscillating system which allows carrying out the operating step according to the invention.

The motor 20 is controlled by an electronic feedback system (not shown) which allows setting a speed and keeping it stable during use.

According to example embodiments, the torch is adaptable to the different working conditions, because the oscillating system described and claimed herein may be used for both inner and outer coating torches.

To this end, the torch 10 is installed on the supporting arm 15, which can be of different length depending on the application and the workpiece to be processed.

In this case, all the tubes/cables necessary to the operation of the torch are contained within the extension of the supporting arm 15 to protect them from exposure to high temperatures.

The apparatus includes the robot 30 including the supporting arm 15, the thermal spray deposition torch 10 which includes the main body as described above.

The torch 10 is configured to be controlled by the robot 30 and the apparatus is configured so as to move the torch according to the two concurrent movements M1 and M2:

the first movement M1 as described above and carried out by linear advancement of the robot 30 with the torch 10 joined to the supporting arm 15;

the second movement M2 as described above and carried out by a rotation of the nozzles about the longitudinal axis with respect to the coupling system and by the motor 20.

The robot 30 is an anthropomorphic robot and the motor 20 and the main body are preferably installed at the end of the robot 30, or a similar handling system and arranged so as to carry out the coating against the surface of the workpiece, orienting its nozzles toward said surface and allow the movement along the rectilinear direction of the first movement M1, or in any case a direction that maintains a predetermined distance from surface S to be coated.

The thermal spray torch 10 for generating the flame used for the thermal coating is connected to a standard control system and the oscillating unit does not interfere with the thermal spray system.

In essence, the head of the thermal spray torch is designed to be installed on an oscillating support, where the oscillating support is motorized and allows a +/−15° oscillation; a motor speed control system and one or more motion transmission mechanisms on the head and/or the nozzles are also provided, as said above.

The method, the thermal spray torch, and the apparatus according to the present invention, allows the following:

1) better control of the coating thickness, with greater precision than a conventional torch, which also allows carrying out the process on (both inner and outer) surfaces of shaped workpieces and at the same time impart greater control to the robot, 2) reduction of the localized temperature allowing for continuous spraying without interruption, 3) saving time for spraying the workpiece, 4) saving on consumable material (electrodes, nozzles, powder, wire, etc.), because it is not necessary to remove the workpiece from the deposition torch, and 5) less wear of the deposition torch movement robots.

The invention claimed is:

1. A method for depositing a coating on a surface of a workpiece, the method comprising:

providing a thermal spray deposition torch comprising a main body having an elongated shape developing around a longitudinal axis, and is provided, at one end of said main body, of a spray head, said spray head comprising at least one dispensing nozzle, and joining the thermal spray deposition torch, at the other end, to a supporting arm of a robot by a coupling system, and controlling the thermal spray deposition torch by the robot, the method further comprising carrying out the deposition by providing a jet of a material to be deposited and moving said thermal spray deposition torch so as to create two concurrent movements and direct the jet of the material to be deposited accordingly, wherein said two concurrent movements comprise:

a first movement along an area of the surface of the workpiece to be coated and in a direction corresponding to said longitudinal axis, said first movement defining a linear path for said jet and being carried out by linear advancement of said supporting arm of said robot with the thermal spray deposition torch, and a second movement of oscillation according to a plane which is transversal to said longitudinal axis, said second movement being carried out by rotating said at least one dispensing nozzle back and forth about said longitudinal axis with respect to said coupling system and by a motor, said motor being either connected to the main body so as to rotate the at least one dispensing nozzle with respect to the main body, or connected to the supporting arm so as to rotate the main body, wherein, the thermal spray deposition torch is configured such that during the second movement, the at least one dispensing nozzle oscillates back and forth continuously while the thermal spray deposition torch concurrently advances along the linear path for said jet according to the first movement.

2. The method according to claim 1, wherein during the two concurrent movements, said longitudinal axis is maintained at a predetermined distance from the surface of the workpiece.

3. The method according to claim 1, comprising rotating said at least one dispensing nozzle only.

4. The method according to claim 3, wherein said second movement is carried out by rotating said at least one dispensing nozzle only of the thermal spray deposition torch about said longitudinal axis.

5. The method according to claim 1, comprising rotating said spray head together with said at least one dispensing nozzle with respect to said coupling system.

6. The method according to claim 5, wherein said second movement is carried out by rotating said spray head of said thermal spray deposition torch about said longitudinal axis.

7. The method according to claim 1, wherein said main body has a substantially cylindrical shape.

8. The method according to claim 1, wherein said second movement is an oscillation of +/−30° about said longitudinal axis.

9. The method according to claim 1, wherein said second movement is an oscillation of +/−15° about said longitudinal axis.

10. A thermal spray deposition torch comprising a main body having an elongated shape developing around a longitudinal axis, and provided, at one end of the main body, of a spray head and at least one dispensing nozzle configured to create a jet of a material to be deposited on a surface of a workpiece to be coated, the thermal spray deposition torch being configured to be controlled by a robot and comprising a coupling system configured to join the thermal spray deposition torch, at the other end of the main body, to a supporting arm of the robot, said thermal spray deposition torch comprising a motor configured to rotate the at least one dispensing nozzle with respect to the main body or configured to rotate said main body, the thermal spray deposition torch being further configured so as to create two concurrent movements to the jet of the material to be deposited, of which:

a first movement along an area of the surface of the workpiece to be coated and in a direction corresponding to said longitudinal axis, defining a linear path for said jet, said first movement being carried out by linear advancement of said thermal spray deposition torch, and a second movement of oscillation according to a plane which is transversal to said longitudinal axis, said second movement being carried out by rotating said at least one dispensing nozzle back and forth about said longitudinal axis with respect to said coupling system by the motor, wherein, the thermal spray deposition torch is configured such that during the second movement, the at least one dispensing nozzle oscillates back and forth continuously while the thermal spray deposition torch concurrently advances along the linear path for said jet according to the first movement.

11. The thermal spray deposition torch according to claim 10, wherein said motor is able to rotate said at least one dispensing nozzle and/or said spray head with respect to said coupling system.

12. The thermal spray deposition torch according to claim 10, wherein said motor is connected to said main body.

13. The thermal spray deposition torch according to claim 10, wherein said motor is configured to rotate said at least one dispensing nozzle only with respect to said coupling system.

14. The thermal spray deposition torch according to claim 10, wherein said motor is configured to rotate said spray head together with said at least one dispensing nozzle.

15. The thermal spray deposition torch according to claim 10, wherein said main body has a substantially cylindrical shape.

16. An apparatus for depositing a coating on a surface of a workpiece comprising a robot including a supporting arm and motor configured to rotate said supporting arm, the apparatus further comprising a thermal spray deposition torch including a main body having an elongated shape developing around a longitudinal axis, and is provided, at one end of the main body, of a spray head and at least one dispensing nozzle configured to create a jet of a material to be deposited on the surface of the workpiece to be coated, the thermal spray deposition torch being configured to be controlled by the robot and comprising a coupling system configured to join the thermal spray deposition torch, at the other end of the main body, to the supporting arm of the robot, the apparatus being configured so as to move the thermal spray deposition torch according to two concurrent movements and create the jet of the material to be deposited moving along said two concurrent movements, of which:

a first movement along an area of the surface of the workpiece to be coated and in a direction corresponding to said longitudinal axis, defining a linear path for said jet, said first movement being carried out by linear advancement of said robot with said thermal spray deposition torch joined to said supporting arm, and a second movement of oscillation according to a plane which is transversal to said longitudinal axis, said second movement being carried out by rotating said at least one dispensing nozzle back and forth about said longitudinal axis with respect to said coupling system and by the motor, wherein, the thermal spray deposition torch is configured such that during the second movement, the at least one dispensing nozzle oscillates back and forth continuously while the thermal spray deposition torch concurrently advances along the linear path for said jet according to the first movement.

17. The apparatus according to claim 16, wherein said motor is connected to said supporting arm.

18. The apparatus according to claim 16, wherein said main body has a substantially cylindrical shape.

* * * * *